United States Patent [19]

Golomb et al.

[11] Patent Number: 5,724,805
[45] Date of Patent: Mar. 10, 1998

[54] POWER PLANT WITH CARBON DIOXIDE CAPTURE AND ZERO POLLUTANT EMISSIONS

[75] Inventors: Dan S. Golomb, Newton; Yulin Shao, Stoneham; Gilbert J. Brown, Westford, all of Mass.

[73] Assignee: University of Massachusetts-Lowell, Lowell, Mass.

[21] Appl. No.: 517,542

[22] Filed: Aug. 21, 1995

(Under 37 CFR 1.47)

[51] Int. Cl.⁶ .............................. F02G 3/00; F02B 43/00
[52] U.S. Cl. .................... 60/39.02; 60/39.12; 60/39.463; 60/39.465; 60/39.52; 60/730
[58] Field of Search ................... 60/39.19, 39.5, 60/39.02, 39.12, 39.52, 39.461, 39.463, 39.465, 730

[56] References Cited

U.S. PATENT DOCUMENTS

| | | | |
|---|---|---|---|
| 4,434,613 | 3/1984 | Stahl | 60/39.07 |
| 4,498,289 | 2/1985 | Osgerby | 60/39.52 |
| 4,528,811 | 7/1985 | Stahl | 60/39.07 |
| 4,974,412 | 12/1990 | Schneider | 60/39.12 |
| 5,388,395 | 2/1995 | Scharpf et al. | 60/39.02 |
| 5,406,786 | 4/1995 | Scharpf et al. | 60/39.12 |
| 5,501,078 | 3/1996 | Paolino | 60/39.12 |

OTHER PUBLICATIONS

Shao, "Conceptual Design and Analysis of A Natural Gas Fired Power Plant With Carbon Dioxide Capture (Pollutants)", Dissertation Abstracts International, 55:1599–B, Oct. 1994.

T. Akiya et al., "High Performance Energy Supply System," Proc. Intersociety Energy Coversion, Eng. Conf., 6:109–114, IEEE Publ., Piscatawag, New Jersey. Date not available.

R. J. Allam et al., "A Study of the Extraction of $CO_2$ from the Flue Gas of a 500 MW Pulverised Coal Fired Boiler," Energy Convers. Mgmt., 33:373–378 (1992).

Bolland et al., "New Concepts for Natural Gas Fired Power Plants Which Simplify the Recovery of Carbon Dioxide," Energy Convers. Mgmt., 33:467–475 (1992).

Cogbill et al., "The Separation and Disposal of Carbon Dioxide from Power Station Flue Gases," Energy Convers. Mgmt. 33:487–494 (1992).

J. De Ruyck, "Efficient $CO_2$ Capture Through A Combined Steam and $CO_2$ Gas Turbine Cycle," Energy Convers. Mgmt., 33:397–403, (1992).

Goldthorpe et al., "System Studies on $CO_2$ Abatement from Power Plants," Energy Convers. Mgmt., 33:459–466, (1992).

Holt et al., "Thermal Power—Without Greenhouse Gases and With Improved Oil Recovery," Energy Convers. Mgmt., 33:595–602, (1992).

(List continued on next page.)

Primary Examiner—Charles G. Freay
Attorney, Agent, or Firm—Fish & Richardson P.C.

[57] ABSTRACT

The invention relates to a power plant including an air separation unit arranged to separate oxygen from air and produce a stream of substantially pure liquid oxygen; a gas turbine arranged to combust a fuel, e.g., natural gas, liquefied natural gas, or synthesis gas, in the presence of substantially pure oxygen gas and carbon dioxide gas, and to produce an exhaust gas comprising water and carbon dioxide; and a carbon dioxide removal unit arranged to recover carbon dioxide gas from the exhaust gas, recycle a portion of the recovered carbon dioxide gas for passage through the gas turbine, and liquefy the remainder of the recovered carbon dioxide gas for removal from the plant. In this new plant, the carbon dioxide removal unit is thermally integrated with the air separation unit by directing the stream of liquid oxygen from the air separation unit to the carbon dioxide removal unit to liquefy the remainder of the recovered carbon dioxide gas, the liquid oxygen thereby evaporating and forming cold oxygen gas which is directed to cool the recycled carbon dioxide gas prior to passage of the carbon dioxide gas through the gas turbine, and the oxygen gas is then directed to the gas turbine.

23 Claims, 3 Drawing Sheets

OTHER PUBLICATIONS

Holt et al., "Offshore Gas Power—Without Greenhouse Gases and with Improved Oil Recovery," IKU, N–7034 Trondheim, 78–94.

Leci, et al., "Assessment of $CO_2$ Removal From Power Station Flue Gas," *Energy Convers. Mgmt.*, 33:477–485 (1992).

Nakayama et al., "Pulverized Coal Combustion in $O_2/CO_2$ Mixtures on a Power Plant for $CO_2$ Recovery," *Energy Convers. Mgmt.*, 33:379–386, (1992).

Suzuki et al., "A Power Generation System with Complete $CO_2$–Recovery Based on Oxygen Combustion Method," *Proc. of the Int.Symp. on $CO_2$ Fixation & Efficient Utilization of Energy*, Tokyo, Japan, pp. 57–64 (1993).

Takano et al., "Technical Studies on $O_2/CO_2$ Pulverized Coal Combustion," *Proc. of The Int. Symp. on $CO_2$ Fixation & Efficient Utilization of Energy*, Tokyo, Japan pp. 95–99 (1993).

Wolsky et al., "Recovering $CO_2$ From Large–and Medium–Size Stationary Combustors," *J. Air Waste Mange. Assoc.*, 41:449–454 (1991).

Shao et al, "Conceptual Design and Analysis of a Nautral Gas Fired Power Plant With Carbon Dioxide Capture (Pollutants)", University of Massachusetts Lowell, Apr. 26, 1994.

POWER PLANT WITH CARBON DIOXIDE CAPTURE AND ZERO POLLUTANT EMISSIONS

BACKGROUND OF THE INVENTION

The invention relates to an improved combined cycle power plant, i.e., an electrical power generating plant, with complete carbon dioxide ($CO_2$) recovery. The plant emits essentially no pollutants, and achieves a high thermal efficiency.

Environmental pollution stemming from fossil-fueled power plants is of worldwide concern. Power plants emit air pollutants that may be toxic, e.g., toxic metals and polyaromatic hydrocarbons; precursors to acid rain, e.g., sulfur oxides ($SO_x$) such as sulfur dioxide ($SO_2$), and nitrogen oxides ($NO_x$); precursors to ozone such as $NO_2$ and reactive organic gases; particulate matter; and greenhouse gases, notably $CO_2$. Power plants also discharge potentially harmful effluents into surface and ground water, and generate considerable amounts of solid wastes, some of which may be hazardous.

Although certain methods and technologies are being developed that reduce emissions and effluents, they are often expensive and require considerable energy. For example, the use of natural gas (NG) as a fuel instead of petroleum or coal reduces many emissions and solids wastes; however, burning NG in air still produces copious quantities of $NO_2$, reactive organic gases, and $CO_2$.

This $CO_2$ can be "captured" or removed from the flue gas using several known methods including air separation/flue gas recycling, amine scrubbing, cryogenic fractionation, and membrane separation. Among these methods, air separation/flue gas recycling is considered to be the most cost and energy efficient, although amine scrubbing is a close competitor. Nevertheless, all of these methods significantly impair the efficiency of the power plants in which they are used.

Flue gas recycling is also used to lower the combustion temperatures in the power plant's gas turbines. This is beneficial because the combustion of a hydrocarbon in pure oxygen yields a much higher temperature than combustion in air. While this higher temperature improves the thermodynamic efficiency of the heat engine, present materials used in combustors, boilers, and gas turbines cannot withstand these high temperatures. Flue gas recycling can lower the combustion temperature to tolerable values. However, as noted above, the flue gas recycling as presently implemented significantly decreases the overall efficiency of the power plant.

A conceptual design of a natural gas-fired power plant with $CO_2$ capture is described in Suzuki et al., Proc. Int'l Symp. on $CO_2$ Fixation and Efficient Utilization of Energy, Tokyo Inst. Tech., Tokyo, Japan, pp. 57–64 (1993). The net efficiency of this plant was estimated to be 40.7 percent. Akiya et al., Proc. 26th Intersoc. Energy Convers. Energy Conf., 6:109 (1991), describes a liquid natural gas (LNG)-fired power plant with $CO_2$ capture that uses the energy of LNG for air separation. The estimated net efficiency of the plant is also about 40 percent.

SUMMARY OF THE INVENTION

The invention features an improved combined cycle power plant that recycles $CO_2$ and emits virtually no pollutants, yet provides a good net thermal efficiency, i.e., electrical energy output versus thermal energy input. The plant is so effective in removing pollutants from the exhaust gases that it needs no smokestack. This plant can be fueled by natural gas (NG), liquid natural gas (LNG), or synthesis gas, e.g., gasified coal. The outstanding benefit of the plant is in recovering essentially 100 percent of the $CO_2$ from the flue gas with a minimal loss of thermal efficiency. The captured $CO_2$ can be sequestered, e.g., in the deep ocean, or put to practical use, such as for enhanced oil recovery, or as a chemical feedstock.

The new power plant offers numerous significant advantages: (1) It is environmentally safe as the result of $CO_2$ capture and zero $NO_x$ and $SO_x$ emissions; (2) it operates at an overall thermal efficiency that is competitive to advanced conventional power plants that pollute the environment; and (3) it produces by-products in a suitable physical state for easy delivery and commercial use.

In general, the invention features a new power plant that includes an air separation unit arranged to separate oxygen from air and produce a stream of substantially pure liquid oxygen; a gas turbine arranged to combust a fuel, e.g., natural gas, liquefied natural gas, or synthesis gas, in the presence of substantially pure oxygen gas and carbon dioxide gas, and to produce an exhaust gas comprising water and carbon dioxide; and a carbon dioxide removal unit arranged to recover carbon dioxide gas from the exhaust gas, recycle a portion of the recovered carbon dioxide gas for passage through the gas turbine, and liquefy the remainder of the recovered carbon dioxide gas for removal from the plant. In this new plant, the carbon dioxide removal unit is thermally integrated with the air separation unit by directing the stream of liquid oxygen from the air separation unit to the carbon dioxide removal unit to liquefy the remainder of the recovered carbon dioxide gas, the liquid oxygen thereby evaporating and forming cold oxygen gas which is directed to cool the recycled carbon dioxide gas prior to passage of the carbon dioxide gas through the gas turbine, and the oxygen gas is then directed to the gas turbine.

The air separation unit can also separate nitrogen from the air and produce a stream of cold, substantially pure nitrogen. The cold nitrogen is directed to cool the air prior to separation of oxygen and nitrogen. The substantially pure nitrogen is at least 95 percent, and preferably at least 97 percent, nitrogen in the form of a gas.

In the new plant, the "substantially pure" liquid (and gaseous) oxygen is at least 95 percent oxygen, and preferably at least 99.5 percent oxygen, or higher. This level of purity (at least 99.5%) is required to achieve the cleanest operation and lowest levels of nitrogen oxides in the exhaust gas, e.g., less than 100 parts per million by volume of nitrogen oxides.

In one embodiment of the new power plant, about 95 percent of the carbon dioxide recovered from the exhaust gas, which includes previously recycled carbon dioxide and carbon dioxide newly produced from combustion, is recycled for passage through the gas turbine, and about 5 percent of the recovered carbon dioxide is liquefied for removal from the plant. When the power plant is operated at a steady state, an amount of carbon dioxide equal to 100 percent of the carbon dioxide produced from combustion is liquefied for removal from the plant.

The air separation unit can include a cooler arranged to cool the air prior to separation of oxygen, a compressor arranged to pressurize the air prior to separation of oxygen, and a distillation tower arranged to separate the oxygen from the air.

The carbon dioxide removal unit can include a compressor arranged to pressurize the remainder of the recovered carbon dioxide gas, a filter arranged to remove water vapor from the remainder of the recovered carbon dioxide gas, a cooler arranged to cool the remainder of the recovered carbon dioxide gas, and a condenser arranged to liquefy the remainder of the recovered carbon dioxide gas using the liquid oxygen as a cooling source.

In another embodiment, the power plant further includes a compressor arranged to pressurize the liquid oxygen from the distillation column, e.g., to a high pressure such as 17 bar, prior to directing the liquid oxygen to the carbon dioxide removal unit to liquefy the remainder of the recovered carbon dioxide gas; and a heat exchanger arranged such that the cold oxygen gas from the air separation unit is used to cool the recycled carbon dioxide gas prior to passage of the carbon dioxide gas through the gas turbine. Preferably, the power plant includes heat exchangers arranged such that both the cold oxygen gas and the cold nitrogen from the air separation unit are used to cool the recycled carbon dioxide gas prior to passage of the carbon dioxide gas through the gas turbine.

The power plant can further include a heat recovery steam generator (HRSG) arranged to produce steam and a flue gas using the exhaust gas from the gas turbine as a heat source, and further arranged to heat the cold oxygen gas produced by liquefaction of the remainder of the recovered carbon dioxide gas, prior to passage of the oxygen into the gas turbine.

In another aspect, the invention features a new method of generating electricity with virtually zero pollutant emissions in a power plant having a gas turbine. The actual amount of pollutant emissions depends on the purity of the oxygen produced and the fuel used for combustion. Thus, "virtually zero pollutant emissions" as used herein means a level of pollutant emissions as close to zero as possible given the purity of the fuel and oxygen entering the gas turbine, e.g., the exhaust gas contains less than 100 parts per million by volume of nitrogen oxides.

The new method includes the steps of arranging the gas turbine to combust a fuel in the presence of substantially pure oxygen gas and carbon dioxide gas, and to produce an exhaust gas including water and carbon dioxide; recovering carbon dioxide gas from the exhaust gas; recycling a first portion of the recovered carbon dioxide gas for passage through the gas turbine; separating oxygen from air and producing a stream of substantially pure liquid oxygen; directing the substantially pure liquid oxygen to cool the recycled carbon dioxide gas prior to passage of the carbon dioxide through the gas turbine, and to liquefy a remaining portion of the recovered carbon dioxide gas for removal from the plant, the liquid oxygen thereby evaporating and forming oxygen gas; and directing the oxygen gas to the gas turbine.

The method can include the further steps of separating nitrogen from the air and producing a stream of cold, substantially pure nitrogen; and directing the cold nitrogen to cool the recycled carbon dioxide gas prior to passage of the carbon dioxide gas through the gas turbine, and to cool the air, i.e., entering the air separation unit, prior to separation of oxygen and nitrogen.

In addition, the method can include the steps of compressing the substantially pure liquid oxygen prior to evaporation of the liquid oxygen during liquefication of the remaining portion of the recovered carbon dioxide gas, thereby forming cold oxygen gas; and heating the cold oxygen gas after directing the cold oxygen gas to cool the recycled carbon dioxide gas, and prior to passage of the oxygen gas into the gas turbine.

In one embodiment of this method, about 95 percent of the recovered carbon dioxide gas is recycled, and about 5 percent of the recovered carbon dioxide gas is liquefied for removal from the plant. During steady state operation, an amount of carbon dioxide equal to 100 percent of the carbon dioxide gas produced from combustion is liquefied for removal from the plant.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the preferred methods and materials are described below. All publications, patent applications, patents, and other references mentioned herein are incorporated by reference. In addition, the materials, methods, and examples are illustrative only and not intended to be limiting.

Other features and advantages of the invention will be apparent from the detailed description, and from the claims.

DETAILED DESCRIPTION

The improved plant combines several basic principles with new techniques. One principle used in the power plant is firing the fuel in pure or highly enriched oxygen instead of air. The combustion of a hydrocarbon in pure $O_2$ produces an exhaust or flue gas consisting of only $H_2O$ and $CO_2$ with possible minor dissociation products, depending on the combustion temperature and pressure. Since $H_2O$ is readily condensable (and reusable), the sole major combustion product is $CO_2$; the efficient capture thereof is the major purpose of the new plant design.

The invention introduces novel approaches and an integrated design to known state-of-the-art components. Two new aspects have been developed. The first is an integrated Air Separation and $CO_2$ Capture (AS/CC) unit. In the AS/CC unit, both processes of $O_2$ production and $CO_2$ removal ("capture") are carried out in a thermally integrated unit that significantly reduces the power consumption of $CO_2$ capture. The exergy ("free energy" available to do work) of liquid oxygen is used to capture $CO_2$ in the AS/CC unit. The integrated AS/CC unit adds between 4 to 6 percent to the overall efficiency of the new power plant.

The second aspect is the Compression-Evaporation Method (CEM) which is used to reduce the compression work of the gas turbine. In a conventional gas turbine, 50 to 60 percent of the total power produced by the gas turbine is consumed by the compressor of the gas turbine. There is little room to change this situation because the inlet fresh air must be compressed before entering the combustor of the gas turbine.

However, the CEM significantly improves the situation by utilizing liquid $O_2$ from the AS/CC unit to condense part of the recycled $CO_2$. Liquid $O_2$ from a double column distillation tower of the AS/CC unit is first compressed to a high pressure, and then used to condense part of the $CO_2$. The rest of the $CO_2$ is recycled back to the gas turbine. Evaporated $O_2$ is heated in a Heat Recovery Steam Generator (HRSG). The recycled $CO_2$ and the evaporated $O_2$ need less compression work, therefore this technique increases the efficiency of the gas turbine by adding about 3 percent or more to the overall power efficiency of the new plant.

The major components of the new plant include a double column distillation tower, $CO_2$ recycle compressor, gas turbine, HRSG, and steam turbine, which are all commercially available. Ordinary, commercially available gas turbines, such as Model V83, manufactured by the General Electric Corporation, can be used in this invention. However, since the working fluid of the new plant (mainly $CO_2$), differs in density, viscosity, specific heat, and heat transfer properties from the design working fluid (mainly $N_2$), the commercially available gas turbines may operate at a somewhat different efficiency.

In the following description, all of the gases were treated as ideal gases, including air, flue gas, $O_2$, $N_2$, and $CO_2$. Steam tables from standard manuals were used to determine the thermodynamic properties of the $H_2O$, such as boiling temperature, enthalpy, and heat capacity.

Process Design of the Power Plant

An overview of the power plant with $CO_2$ capture is given first, followed by a detailed description of the AS/CC unit and the CEM as used in a specific design for a natural gas-fired power plant. Modifications required for use of the AS/CC and CEM in a gasified coal-fired plant are also described.

Figure 1:
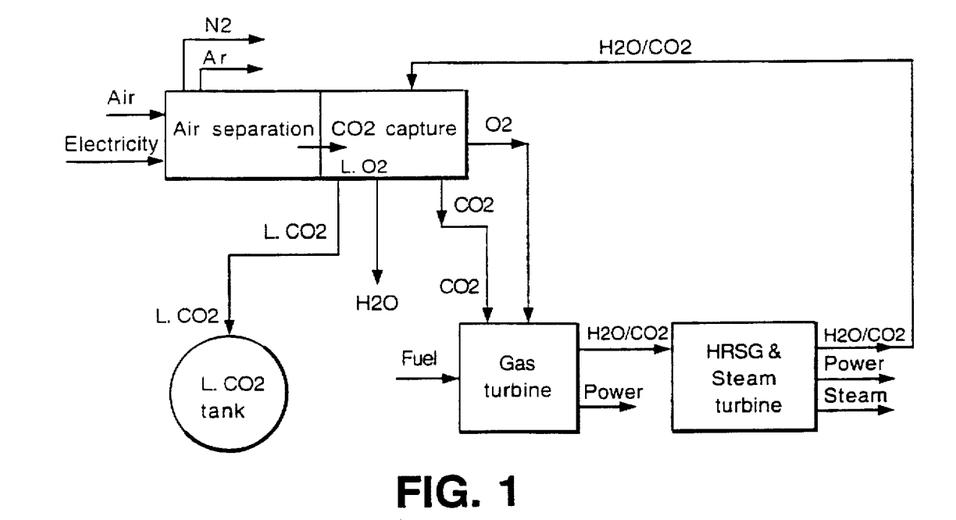
FIG. 1 is a block diagram of the overall organization of a new recycling plant fired by natural gas.

FIG. 1 shows the overall design of a natural gas-fired power plant according to the invention. As shown in FIG. 1, air is separated in the AS/CC unit into liquid $O_2$, gaseous $N_2$, and argon (Ar). The gaseous $N_2$ can be either vented into the atmosphere or sold as a by-product. The argon is produced as a by-product. The liquid $O_2$ is compressed, e.g., to 17 bar, then sent to the $CO_2$ liquefier to be evaporated while condensing the gaseous $CO_2$. The evaporated $O_2$ is then sent to the combustor of the gas turbine. The combustion products are essentially $CO_2$ and $H_2O$, which are used to generate power in the gas turbine.

The gas turbine exhaust ($H_2O/CO_2$) is used to generate steam in the HRSG for power generation in the steam turbine. Part of the steam may be used as process steam (cogeneration). After leaving the HRSG, the flue gas is cooled to room temperature. Water vapor is then removed from the flue gas, leaving pure $CO_2$ in the stream. The $CO_2$ splits into two streams. One is recycled, while the other is removed from the system as a saleable by-product.

The plant has a net efficiency of 45%, compared to the gross efficiency (without $CO_2$ capture) of 54%. This is a modest efficiency loss when weighed against the environmental benefits of this plant, and the possibility of deriving revenue from the sale of pure liquid $CO_2$ and pure gaseous nitrogen and argon. The net efficiency of the plant can reach 47% when LNG is used instead of NG. The plant can also be run in a cogeneration mode, in which process or district heating steam can be sold as a by-product.

Figure 2:
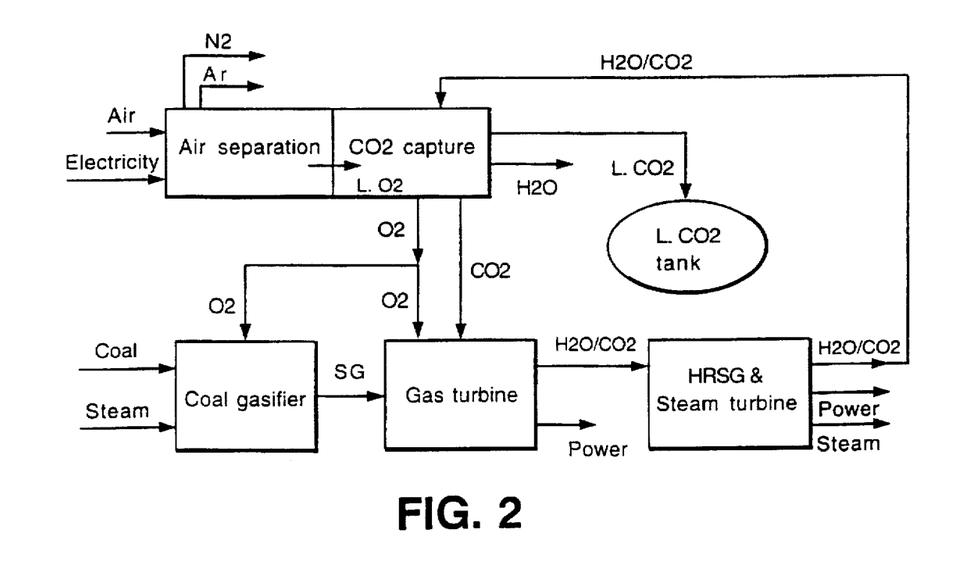
FIG. 2 is a block diagram of the overall organization of a new recycling plant fired by gasified coal.

As shown in FIG. 2, the overall design of the gasified coal-fired power plant according to the invention is quite similar to the design described above, but allows the use of coal, rather than natural gas, as the fuel. A standard commercial coal gasification process can be used as described in, e.g., Schütz et al., Energy Conversion and Management, 33:357–363 (1992); Hendriks and Blok, Energy Conversion and Management, 33:387–396 (1992); and J. Douglas, Electric Power Research Institute Journal, pp. 2–11, September 1986.

Both the steam and oxygen supply needed for coal gasification comes from the new power plant with $CO_2$ capture. A portion of the steam generated in the Heat Recovery Steam Generator (HRSG) serves as the steam input of the coal gasifier. Also, a portion of the oxygen generated in the AS/CC is directed to the oxygen input of the coal gasifier.

Specifically, ambient air is separated in the AS/CC unit into liquid $O_2$, gaseous $N_2$, and Ar, as in the NG-fired plant, and both the $N_2$ and Ar can be either vented into the atmosphere or sold as a by-product. However, in the coal-fired plant, the produced $O_2$ splits into two streams. One stream is diverted to the coal gasifier, where coal, $O_2$, and steam are converted into synthesis gas ("syngas" or SG), which in its simplest form consists of carbon monoxide and hydrogen. The other $O_2$ stream is sent to the combustor of the gas turbine. The combustion products are $CO_2$ and $H_2O$.

As in the natural gas-fired plant, the gas turbine exhaust is used to generate steam in the HRSG for power generation in the steam turbine. After leaving the HRSG, the flue gas is cooled to room temperature. Water vapor is removed from the flue gas, and the remaining flue gas is substantially pure $CO_2$, which is split into two streams. One stream is recycled, and the other is removed from the system, e.g., as liquid $CO_2$.

Combustion of NG or SG in a mixture of $CO_2/O_2$ involves the intimate mixing of NG or SG with $O_2$ molecules in a moving stream. Oxygen must be introduced around the NG or SG nozzle in the combustor. Recycled $CO_2$ is introduced gradually downstream of the nozzle. The flame length should be sufficient to allow NG or SG enough time and space for complete combustion.

The net thermal efficiency of the SG or gasified coal-fired plant, i.e., the electric energy generated versus the thermal energy of coal input, including the energy required for oxygen production, coal gasification, and $CO_2$ compression and recycling, is 36.6 percent. This is about 8 percent lower than the natural gas-fired plant, which does not require energy for coal gasification.

Air Separation And $CO_2$ Removal (AS/CC) Unit

Air separation can be accomplished using commercially available devices that use known processes such as cryogenic separation, pressure-swing adsorption, membrane separation, or Brin's process. The cryogenic process is preferred for use in the AS/CC unit.

Figure 3:
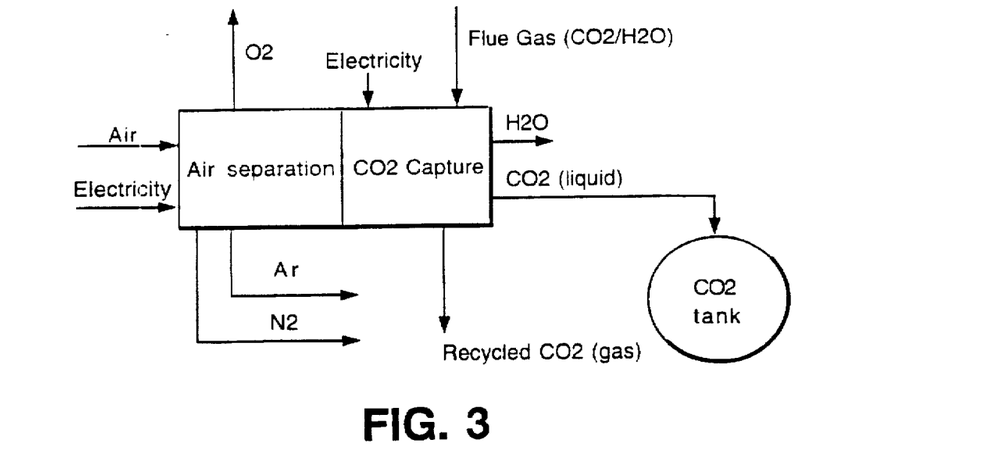
FIG. 3 is a block diagram of the integrated air separation and $CO_2$ capture (AS/CC) unit.

FIG. 3 shows the overall conceptual design of the AS/CC. The air separation part of the AS/CC unit separates the ambient air into pure $O_2$, $N_2$, and Ar. The cold energy of $O_2$ and $N_2$ is used to cool the flue gas coming from the gas turbine. The $H_2O$ of the flue gas is condensed and removed in the $CO_2$ capture part of the AS/CC unit. The majority of the $CO_2$ gas from the exhaust gas, which includes previously recycled $CO_2$ and $CO_2$ newly produced from combustion, typically 95 percent or more, is recycled. The remainder of the $CO_2$ gas separated from the exhaust or flue gas is liquefied and stored in a $CO_2$ tank, e.g., for sale as a by-product. Solid $CO_2$ can also be produced as a by-product with simple modifications of the system.

Theoretically, the liquid $O_2$ contains enough cold energy to liquefy the recycled $CO_2$. However, in practice the cold energy of $O_2$ is not totally sufficient for the process. Thus, some energy, e.g., electricity, is required to compress the $CO_2$ to a pressure sufficient for liquefication, e.g., greater than 5.1 bar. Still, this process will save significant amounts of power necessary to liquefy gaseous $CO_2$.

In the AS/CC unit, $O_2$ production and $CO_2$ capture are carried out in a thermally integrated unit. The total energy consumption of the AS/CC unit in the plant described below for $CO_2$ removal is as low as 400 kWh per tonne of $CO_2$ removed, compared with 550 to 800 kWh of energy required to remove each tonne of $CO_2$ from ordinary flue gas using known methods. These numbers are based on the assumptions that the plant generates 210 MW of electricity and 51 tonnes of process steam per hour, and 9878 tonnes of nitrogen, 162 tonnes of argon, and 2102 tonnes of liquid carbon dioxide per day.

These numbers compare well with numbers for known air separation units, which require about 280 to 400 kWh of electricity to produce one tonne of $O_2$, and typical $CO_2$ removal units, which require about 160 to 250 kWh of electricity to capture one tonne of $CO_2$. Together, these units require a total of 550 to 800 kWh to remove one tonne of $CO_2$ and produce one tonne of $O_2$.

Compression-Evaporation Method (CEM) And Energy Recovery

Figure 4:
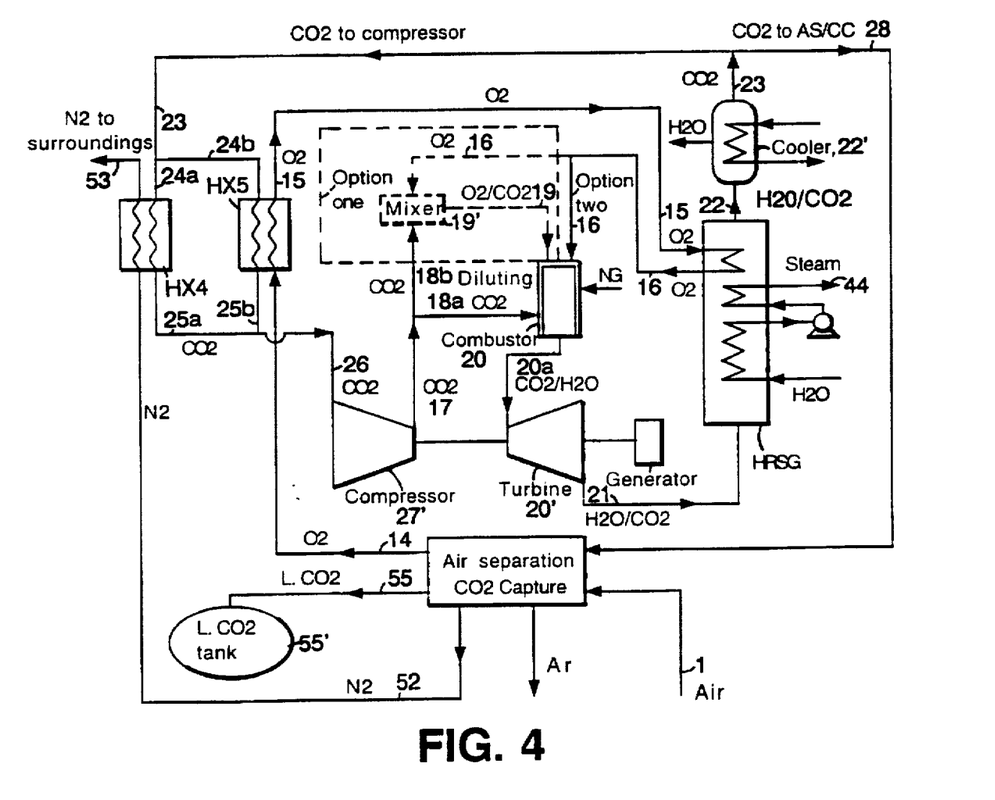
FIG. 4 is a schematic of an apparatus for carrying out the compression-evaporation method (CEM).

FIG. 4 is a detailed schematic diagram of the CEM. An AS/CC unit separates ambient air (state 1) into liquid $O_2$, $N_2$, and Ar. The cold exergy of liquid $O_2$ is used to liquefy $CO_2$, thereby evaporating the $O_2$. The liquid $CO_2$ (stream 55) is stored in a $CO_2$ tank 55'. The cold, high pressure $O_2$ gas (stream 14) leaving the AS/CC is used to cool the recycled $CO_2$ (stream 24b) in heat exchanger HX5. The cold $N_2$ (stream 52) from the AS/CC unit is used to cool stream 24a (recycled $CO_2$) in heat exchanger HX4.

Two streams (25a and 25b) of the cooled recycled $CO_2$ are recombined to produce stream 26, a portion of which (stream 27) enters the compressor 27' of the gas turbine 20'. Lowering the inlet temperature of the compressor increases the gas density and power capacity of the gas turbine. A decrease of one degree Kelvin (K) in the inlet temperature raises the power capacity of the gas turbine by about 1%.

The gaseous $O_2$ (stream 15) is further heated in the HRSG to a high temperature (stream 16). This design raises the average inlet temperature of the working fluid of the gas turbine, which in turn, reduces fuel consumption. The fuel consumption of a gas turbine depends on combustion efficiency, the average inlet temperature of the working fluid, and the final average temperature of the combustion products.

$O_2$ can be supplied to the combustor 20 of the gas turbine in two ways. In a first option, the $O_2$ (stream 16) is mixed with a portion of the recycled $CO_2$ (stream 18b) in a mixer 19' to produce a stream 19 which enters the combustor of the gas turbine. This ensures a good mixing result. Alternatively, in a second option, $O_2$ (stream 16) is sent directly to the combustor 20. The effluent gas (stream 20a) of the combustor consists of $H_2O$ and $CO_2$, and is used to power the gas turbine 20'. The thermal energy of the exhaust gas (stream 21) of the gas turbine is utilized to generate high pressure steam (stream 44) in the HRSG.

The flue gas (stream 22) leaving the HRSG is cooled to room temperature (stream 23) by ambient water in a water cooler 22' where water vapor of the flue gas is condensed and removed. The rest of the flue gas is pure $CO_2$ (stream 23). The $CO_2$ splits into two streams 27 and 28. Stream 27, about 95% of the total, is recycled to the compressor 27' of the gas turbine 10'. $CO_2$ stream 28 is sent to the AS/CC unit to be liquefied as a by-product.

A Natural Gas-Fired Power Plant

The following power plant is designed to generate 210 MW of electricity and 51 tonnes of process steam (10 bar and 453° K) per hour. The plant will also produce saleable by-products including 9878 tonnes of $N_2$, 162 tonnes of Ar, and 2102 tonnes of liquid $CO_2$ per day. The plant will generate both electricity and process steam with no environmental impact while yielding high power efficiency and good economic profit.

Integrated Air Separation and $CO_2$ Removal

Figure 5:
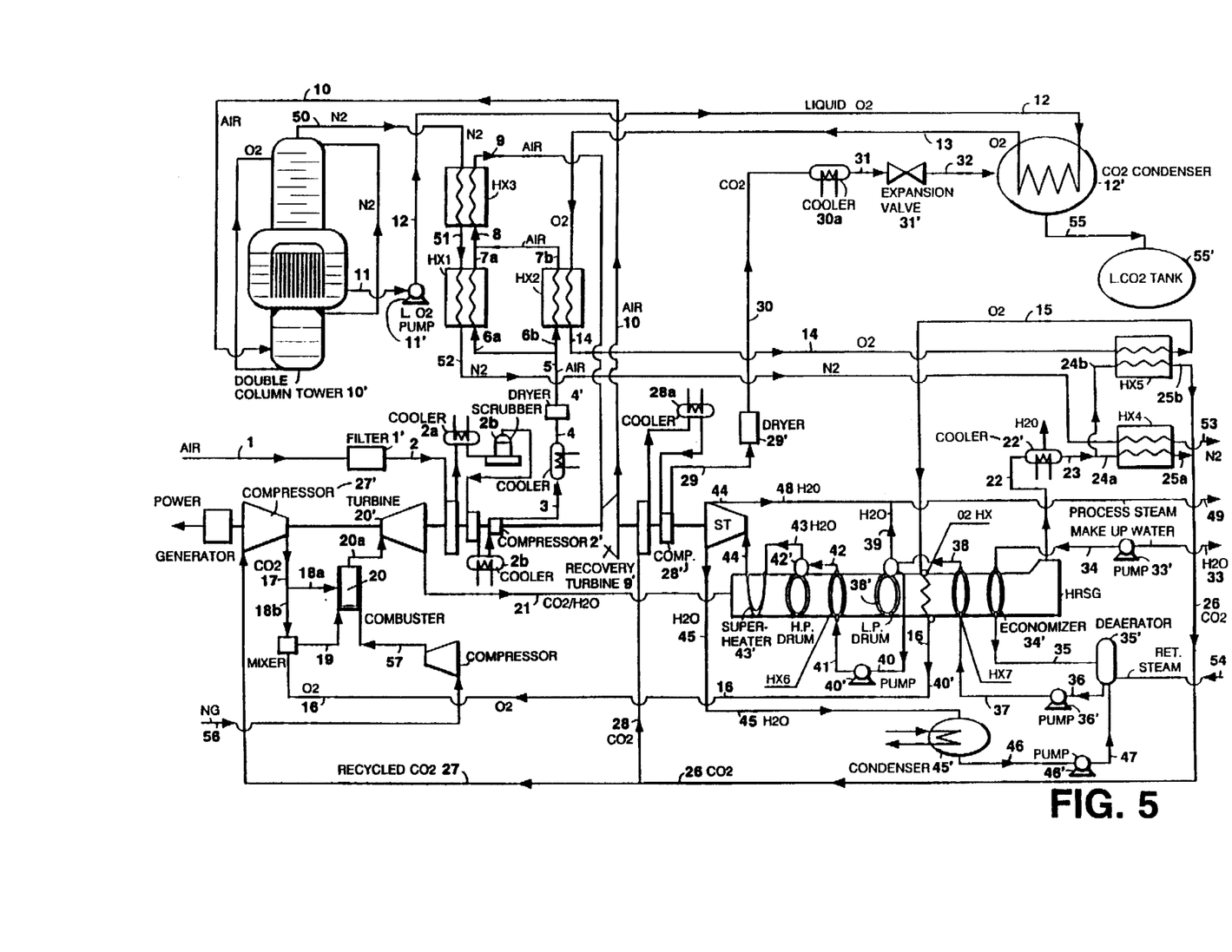
FIG. 5 is a detailed schematic of one embodiment of a new, natural gas-fired recycling plant.

FIG. 5 is a detailed schematic diagram of a natural gas-fired power plant. The starting point of the process is the production of pure $O_2$ which is separated from the ambient air. The ambient air (stream 1) is first passed through a dust filter 1'. The clean air (stream 2) is compressed to a high pressure (stream 3), e.g., 18 bar, by a three-stage compressor 2'. The air is cooled by ambient water in coolers 2a and 2b between each stage. $CO_2$ in the compressed air is removed in a $CO_2$ scrubbing tower 2c using a caustic soda solution which is a conventional apparatus, e.g., as described in Austin, Shreve's Chemical Process Industries (McGraw-Hill, New York, 1984).

The discharged air (stream 3) is cooled again by ambient water in cooler 3' to state 4. An alumina drier 4' removes water vapor in the compressed air. The air stream 5 splits into two streams. Stream 6a is cooled by cold gaseous $N_2$ in a first heat exchanger HX1. Stream 6b is cooled by the cold gaseous $O_2$ in a second heat exchanger HX2. The two streams are recombined to produce stream 8. Stream 8 is cooled by cold $N_2$ (stream 50) alone in a third heat exchanger HX3. The compressed and cold air (stream 9) is further cooled by expansion through a recovery turbine 9', which recovers some energy of the compressed air. The exhausted temperature and pressure of the air (stream 10) is 104° K and 5 bar respectively.

Air stream 10 is then sent to the double column distillation tower 10', which consists of two tray-type distillation columns thermally connected at the center through a heat exchanger. The heat exchanger serves as a condenser for the lower column and a boiler for the upper column. Because $N_2$ is more volatile than $O_2$, $N_2$ will ascend and $O_2$ will descend in each column. On the boiler side of the upper column, there is a pool of high purity liquid $O_2$, while on the condenser side of the lower column, $N_2$ is condensed. Because the normal boiling temperature of $O_2$ is 12.8° K higher than that of $N_2$, the pressure in the lower column must be high enough to raise the condensing temperature of $N_2$ sufficiently to provide a positive temperature driving force in the main condenser. Thus, the pressure of the lower column should be between 5 and 6 bar. The corresponding temperature of the column should be kept at about 103° to 104° K.

The condensed $N_2$ is split. One portion of $N_2$ returns to the lower column as reflux, and the other portion is sent to the upper column also as reflux. An $O_2$ rich liquid stream leaves the bottom of the lower column and serves as the main feed stream for the upper column. The pure $O_2$ product removed as a saturated liquid (stream 11) from the main condenser has a purity of at least 99.7%. High purity $N_2$ (stream 50), with 2% to 3% $O_2$, is removed as saturated vapor from the top of the upper column.

The separated liquid $O_2$ (stream 11) at 1.5 bar from the upper column is compressed in a pump 11' to 17 bar (stream 12), then sent to a $CO_2$ condenser 12' to liquefy the pure $CO_2$ gas (stream 32). This process saves most of the power used in liquefying the gaseous $CO_2$ separated from the flue gas. Compression of liquid $O_2$ requires much less work than compression of gaseous $O_2$. Thus, this process saves significant amounts of power in capturing $CO_2$ compared to other designs where the separation and $CO_2$ removal units are not thermally integrated.

Flue gas containing $CO_2$ and $H_2O$ (stream 22) from the heat recovery steam generator (HRSG) is cooled by ambient water in cooler 22' where water vapor in the flue gas is condensed and removed from the $CO_2$. Cooled $CO_2$ stream 23 splits into two streams 24a and 24b which are proportional to the mole flow rate of $N_2$ and $O_2$, respectively. Such a design ensures that the two streams will have the same final temperature. Stream 24a is cooled by cold $N_2$ (stream 52) from the distillation column in a fourth heat exchanger HX4. Stream 24b is cooled by cold $O_2$ (stream 14) from the $CO_2$ condenser in a fifth heat exchanger HX5. The temperature of the $O_2$ (stream 2) depends on the operating conditions, which are usually in the range of 270°–280° K.

Two streams of $CO_2$, now cooled, are recombined to produce stream 26, which then splits into streams 27 and 28. Stream 27 is recycled back to the compressor 27' of the gas turbine 20'. Stream 28 is compressed to state 29 in a two-stage compressor 28' with inter-stage cooling (cooler 28a). Drier 29' uses silica gel or a molecular filter to remove the rest of the water vapor in the $CO_2$ to avoiding icing during liquefaction of the $CO_2$. The compressed, dry $CO_2$ gas (stream 30) is cooled again by ambient water in cooler 30a to produce stream 31. Stream 31 is further cooled by expansion through an expansion valve 31'. In the $CO_2$ condenser 12', gaseous $CO_2$ is liquefied by evaporation of the liquid $O_2$ (stream 12) produced in the double column tower 10'. The condensed liquid $CO_2$ (stream 55) is stored in a $CO_2$ tank 55'.

Gas Turbine

A model V83 gas turbine, manufactured by General Electric, or the like, e.g., having a mass flow rate of the flue gas of about 420 kg/sec when burning NG in air, can be used in the new power plant. When burning NG in a mixture of $O_2$ and $CO_2$, the mass flow rate of the flue gas would be about 621 kg/sec.

As shown in FIG. 5, cold $N_2$ (stream 52) and $O_2$ (stream 14) from the air separation process are used to cool the recycled $CO_2$ (stream 27) before the $CO_2$ enters the turbine compressor. Therefore the temperature of the recycled $CO_2$ (stream 27) can be kept at a desired value regardless of the variation of the surrounding temperature. This will eliminate the power capacity variations found in conventional air combustion gas turbines where air temperature changes lead to air density changes, which in turn impact the mass flow of the air through the gas turbine and consequently the power capacity.

The gaseous $O_2$ (stream 15) from heat exchanger HX5 is heated by an $O_2$ heat exchanger (O2HX) in the HRSG. The heated $O_2$ (stream 16) is mixed with $CO_2$ stream 18b in mixer 16'. The mixed stream 19 is then sent to the combustor 19'. $CO_2$ stream 18a is used as diluting fluid.

Combustor

The combustion of natural gas (NG) occurs mostly in the recirculation and combustion zones, and involves the intimate mixing of molecules of NG with $O_2$ molecules. Since $O_2$ is a small portion of the working fluid, the mixture of $O_2$ and $CO_2$ should be introduced around the NG nozzle in the combustor to provide a high temperature and a good mixing with NG for rapid combustion. The flame length must be suitable to allow enough time and space for the NG to be completely burned.

Since NG is burned in an $O_2$ enriched atmosphere in this plant design, the flame temperature is much higher than if NG were burned in air. A significant percentage of the $CO_2$ in the combustion products is in a dissociation state (CO). If the hot gas were to pass directly to the dilution zone and be rapidly cooled by addition of massive amounts of $CO_2$, the CO would "freeze" and be discharged unburned. Therefore, the diluting $CO_2$ should be gradually introduced along the combustor. The combustor should be large enough to allow the CO enough space and time to release heat and revert to $CO_2$.

Steam Turbine and HRSG

The steam turbine can have a rated power capacity of, e.g., 75 MW. Commercially available HRSGs are designed to recover a high percentage, e.g., at least 92 percent, of the thermal energy in the exhaust gas from the gas turbine.

The thermal energy of the $CO_2/H_2O$ exhaust (stream 21) of the gas turbine 20' is utilized to generate steam in the HRSG. The HRSG produces steam at two different pressures to utilize the thermal energy of the exhaust gas efficiently. High pressure steam (stream 44) is generated in a high pressure drum 42' and superheater 43', and is used mainly to generate electricity.

When the plant is operated as a cogeneration plant, process steam (stream 49) consists of two streams 39 and 48. Low pressure steam (stream 39) is generated in a low pressure drum 38'. Stream 48 is extracted from the middle stages of the steam turbine 44'. When more process steam is required, steam can be extracted from the steam turbine. However, the extraction of steam will reduce the power output of the steam turbine.

The make-up water (stream 33) of the HRSG is at ambient temperature (300° K) and is pumped to a higher pressure by pump 33'. Stream 34 is heated (stream 35) in an economizer 34', and then sent to a deaerator 35' to remove excess air. Ninety percent of the process steam (stream 54) is returned to the plant.

The average temperature of the mixed water (state 36) in the deaerator is about 350° K. This water is pumped by pump 36' to heat exchanger HX7 to be heated to about 453° K. In the low pressure steam generator, a fraction of the water (stream 39) is evaporated and sent out as process steam at 453° K and 10 bar. The rest of the water (stream 40) is pumped to a high pressure steam (stream 41) by pump 40', then further heated (stream 42) in a sixth heat exchanger HX6. Stream 42 is sent to a high pressure generator 42'. The saturated steam (stream 43) is further heated in a superheater 43'. The superheated steam (stream 44) expands through a steam turbine 44' to generate electricity. A fraction (stream 48) of the steam is extracted at 10 bar and delivered as process steam (stream 49). The rest of the steam is further expanded in the turbine. The exhaust steam (stream 45) is condensed in a condenser 45' to state 46, is pumped to a high pressure (8 bar) by pump 46', and directed to the deaerator 35'.

Steady State Model of the Power Plant

A steady state model of the power plant depicted in FIG. 5 was used to determine the temperatures and pressures at key points in the plant. In this model, it was assumed that the ambient temperature is 300° K, the minimum temperature difference between the hot stream and the cooled stream in all of the coolers is 10° K, the net electric output of the plant is 210 MW, and the process steam output is 51 tonnes per hour. The thermal states of the working fluids in the process are calculated using the first and second laws of thermodynamics. The equations used to determine the values in Table 1 below can be derived from the principles of thermodynamics, and are found in the Ph.D. Thesis of Dr. Yulin Shao, entitled "Conceptual Design and Analysis of a Natural Gas Fired Power Plant with Carbon Dioxide Capture." This thesis is available at the O'Leary Library at the University of Massachusetts, Lowell, Mass. (catalog number 1994 PH-4). The thesis is also available on microfilm at the Lydon Library of the University of Massachusetts, Lowell, Mass.

These equations, like the numbers in Table 1 below, are representative of one model of a power plant according to the invention, and are not required to manufacture such a plant.

The following additional assumptions were made to generate the data in Table 1: the efficiency of the air compressor is 90%, the efficiency of the recovery turbine is 90%, condensing pressure of $CO_2$ is 7.34 bar, condensing pressure of the steam turbine is 0.2 bar, and the temperature of the returned process steam is 443° K.

TABLE 1

Steady State of the Power Plant

| Point | Mass | T (K) | P (bar) |
|---|---|---|---|
| 1 | air | 300 | 1 |
| 2 | air | 300 | 1 |
| 3 | air | 406 | 18 |
| 4 | air | 310 | 18 |
| 5 | air | 310 | 18 |
| 6a | air | 310 | 18 |
| 6b | air | 310 | 18 |
| 7a | air | 240 | 18 |
| 7b | air | 240 | 18 |
| 8 | air | 240 | 18 |
| 9 | air | 145 | 18 |
| 10 | air | 104 | 5 |
| 11 | O2 | 90 | 1.5 |
| 12 | O2 | ≈110 | 17 |
| 13 | O2 | 210 | 17 |
| 14 | O2 | 280 | 17 |
| 15 | O2 | 300 | 17 |
| 16 | O2 | 433 | 17 |
| 17 | CO2 | 605 | 17 |
| 18a | CO2 | 535 | 17 |
| 18b | CO2 | 535 | 17 |
| 19 | O2/CO2 | 490 | 17 |
| 20 | O2/CO2 | 529 | 17 |
| 20a | CO2/H2O | 1140 | 17 |
| 21 | CO2/H2O | 810 | 1.1 |
| 22 | CO2/H2O | 393 | 1.1 |
| 23 | CO2 | 310 | 1.1 |
| 24a | CO2 | 310 | 1.1 |
| 24b | CO2 | 310 | 1.1 |
| 25a | CO2 | 300 | 1.1 |
| 25b | CO2 | 300 | 1.1 |
| 26 | CO2 | 300 | 1.1 |
| 27 | CO2 | 300 | 1.1 |
| 28 | CO2 | 300 | 1.1 |
| 29 | CO2 | 383 | 8 |
| 30 | CO2 | 383 | 8 |
| 31 | CO2 | 310 | 8 |
| 32 | CO2 | 304 | 7.43 |
| 33 | H2O | 300 | 5 |
| 34 | H2O | 300 | 8 |
| 35 | H2O | 353 | 8 |

TABLE 1-continued

Steady State of the Power Plant

| Point | Mass | T (K) | P (bar) |
|---|---|---|---|
| 36 | H2O | 349 | 8 |
| 37 | H2O | 349 | 10 |
| 38 | H2O | 453 | 10 |
| 39 | H2O (steam) | 453 | 10 |
| 40 | H2O | 453 | 10 |
| 41 | H2O | 453 | 58 |
| 42 | H2O | 555 | 58 |
| 43 | H2O (steam) | 555 | 58 |
| 44 | H2O (steam) | 755 | 58 |
| 45 | H2O (steam) | 333 | 0.2 |
| 46 | H2O | 333 | 0.2 |
| 47 | H2O | 333 | 8 |
| 48 | H2O (steam) | 453 | 10 |
| 49 | H2O (steam) | 453 | 10 |
| 50 | N2 | 91 | 1.5 |
| 51 | N2 | 210 | 1.5 |
| 52 | N2 | 280 | 1.5 |
| 53 | N2 | 300 | 1.5 |
| 54 | H2O | 433 | 8 |
| 55 | CO2 (liquid) | 225 | 7.43 |
| 56 | NG | 300 | 1.5 |
| 57 | NG | 438 | 17 |

Material and Energy Balance

The design of the gas turbine and the HRSG and steam turbine governs the material and energy flows of the system. The material and energy balance of the natural gas-fired power plant include (1) the gas turbine, (2) the steam turbine and HRSG, and (3) the integrated AC/CC unit. The detailed calculation is based on the following assumptions: (a) the inlet temperature of the gas turbine is 1140° K; (b) the exhaust temperature of the gas turbine is 810° K; (c) the pressure ratio of the gas turbine is 15.6; (d) the mole flow rate of the gas turbine is 14.737 mole/s, which leads to a mass flow of the exhaust (flue) gas of 420 kg/s when burning NG in air, and 621 kg/s in a mixture of $O_2/CO_2$; (e) the compressor adiabatic efficiency is 85%; (f) NG consists of 82% $CH_4$ and 18% $C_2H_6$; (g) the rated power capacity of the steam turbine is 75 MW; (h) the inlet temperature and pressure of the steam turbine are 755° K and 58 bar, respectively; (i) the condensing pressure of the steam is 0.2 bar; and (j) moisture of the exhaust steam is 14%.

Table 2 below lists the material balance of the components of the NG-fired plant. Table 3 lists the energy balance.

TABLE 2

Material Balance of an NG-Fired Plant

|  | Mass | In (kg/s) | Out (kg/s) |
|---|---|---|---|
| GT | NG | 8.7 |  |
|  | O2 | 35 |  |
|  | CO2 | 577.7 |  |
|  | Flue Gas |  | 621.4 |
| HRSG&ST | Flue Gas | 621.4 | 621.4 |
|  | H2O | 80 | 80 |
| AS/CC | Air | 151.3 |  |
|  | O2 |  | 35 |
|  | N2 |  | 114.3 |
|  | AR |  | 2 |
|  | Flue Gas | 621.4 |  |
|  | CO2 |  | 25.3 |
|  | $CO_{2r}$ |  | 577.7 |
|  | H2O |  | 18.4 |

TABLE 3

Energy Balance of an NG-Fired Plant

|  |  | In (MW) | Out (MW) |
|---|---|---|---|
| GT | Energy* | 477 | 281 |
|  | Electricity |  | 168.9 |
| HRSG & ST | Energy | 281 |  |
|  | Electricity |  | 83.3 |
| AS/CC | Electricity | 42.2 |  |
|  | Cold exergy |  | 20 |

*includes 464 MW chemical energy and 13 MW thermal energy

Efficiency Analysis

To produce electric power, the gas turbine consumes a certain amount of $O_2$ per day. $CO_2$ production is proportional to $O_2$ consumption. The net power output of the plant is the difference the total electric power produced by the plant and the power consumed by the processes of $O_2$ production and $CO_2$ removal. The power efficiency of the plant is defined as the ratio of the total electricity output to the total energy input. When auxiliary power consumption is consider such as lighting and pumping, the power efficiency of the new plant is $$\eta_{net} = (P_{GT} + P_{ST} - P_i)(1-e)(E_{in})^{-1} \quad (1)$$

where $\eta_{net}$ is net efficiency of the plant, $P_{GT}$ is the power output of gas turbine, $P_{ST}$ is the power of the steam turbine, $P_i$ is the internal power consumption, e is a factor representing auxiliary power consumption, and $E_{in}$ is the energy input of the new plant.

Assuming e is 0.5%, the net power efficiency of the NG-fired plant ($\eta_{net}$) is 45 percent. The gross power efficiency, defined as the total power generated to the total energy input ($\eta_{gross}$), is 54 percent. When LNG is used instead of NG, $\eta_{net}$ is 47 percent. Thus, 16.6% is lost due to $CO_2$ recapture.

A Gasified Coal-Fired Power Plant

FIG. 2 illustrates a block diagram of a power plant fired by gasified coal or syngas (SG). The innovation of the gasified coal-fired plant is the integration of state-of-the-art technologies, and the introduction of the AS/CC and CEM described above, which work equally well in a gasified coal-fired plant. These new techniques and methods are modified for use in the gasified coal-fired plant.

For example, fifty to sixty percent of the total power generated by the turbine is consumed by the compressor. There is little room to change this situation in conventional gas turbines, because inlet fresh air must be compressed before entering the combustion. The new gasified coal-fired plant reduces the energy consumed by the compressor by use of the CEM. Liquid $O_2$ produced from the double column distillation tower in the AS/CC is first compressed to a high pressure. The $O_2$ is then evaporated and heated in exchangers by condensing captured $CO_2$ and cooling inlet fresh air used for air separation. Finally, the $O_2$ is sent to the combustor. Since compression of a liquid requires much less energy than compression of a gas, this design will save a portion of the power used by the compressor. About 10 percent of the "combustion air" of the gas turbine bypasses the compressor section. The reduction of mass flow saves up to about 3 percent of the compression energy of the gas turbine.

Simulation of the flame characteristics in the combustor, in both the NG-fired and SG-fired plant, can be performed using Sandia CHEMKIN computer software described in Kee et al., The CHEMKIN Computer Code, SAND80-8003 (1980). An analysis of the optimum ratio of $CO_2/O_2$ also can be performed using this software. The optimum mass ratio is estimated to be 12:1. An excess of 3 percent oxygen over the stoichiometric amount is deemed necessary for complete combustion.

On the basis of the results of such a simulation, heat transfer theory, and energy balance, the quantity of the recycled flue gas and the average temperature of the combustion products (stream 20a) is estimated to be 1140° K. The temperature of the combustion products should be in the range tolerable to the turbine materials. Under well-designed film cooling, most turbine materials can withstand temperatures up to 1400°–1500° K.

It is also noted that this plant, fired either by pure NG or SG, produces no nitrogen oxides ($NO_x$). Since NG or SG are combusted in almost pure oxygen (99.5+% pure), there is no opportunity to form $NO_x$ in the combustor. CHEMKIN computer code calculations confirm that the concentration of $NO_x$ will be only in the tens of parts per million by volume (ppmV) in the flue gas when NG or SG are combusted in 99.5 percent oxygen and 0.5 percent nitrogen. Preferably this number is less than 100 ppmV of $NO_x$.

Syngas can be combusted in $O_2/CO_2$ in three modes: (1) with the gases premixed; (2) with SG and $O_2$ premixed, and $CO_2$ added downstream; and (3) using a concentric annulus burner in which an inner annulus supplies SG, a middle annulus provides $O_2$, and an outer annulus supplies $CO_2$.

Material and Energy Balance of an SG-Fired Plant

Coal gasifier

Coal is gasified in the coal gasifier, along With $O_2$ and water. The Low Heating Value (LHV) of the coal used in the gasified coal-fired plant is assumed to be 25 MJ/kg. In commercial coal gasifiers, the mass ratio of coal to $H_2O$ is about 1.3–2.5, and the mass ratio of $O_2$ to coal is in the range of 0.35 to 1. Syngas can consist of, e.g., 40–60% CO, 10–30% $CO_2$, 20–30% $H_2$, and 1–2% other gases. The mass flow of SG can be determined according to the mass balance of the coal gasifier.

$$M_{SG} = M_{cl} + M_{O2} + M_W - M_{sl} \quad (2)$$

where $M_{SG}$ is the mass flow of SG, $M_{cl}$ is the mass flow of coal, $M_{O2}$ is the mass flow of $O_2$, $M_W$ is the mass flow of water, and $M_{sl}$ is the mass flow of slag.

The energy input of the gasifier consists of the energy of coal, water, and $O_2$. The energy output of the gasifier consists mainly of the combustion heat of SG.

Gas turbine

In the SG-fired plant, the working fluid of the gas turbine is mainly $CO_2$. Similar to the NG-fired plant, the mass flow rate of the exhaust of the gas turbine is given by the turbine manufacturer. The rest of the mass flow rates of the gas turbine including SG, $O_2$, and recycled $CO_2$ can be determined. When the energy efficiency of the gas turbine is the same as that in the NG-fired plant, the power output of the gas turbine is $P_{GT} = \eta_{GT} E_{SG}$. Here, $P_{GT}$ is the power output of the gas turbine, $\eta_{GT}$ is the energy efficiency of the gas turbine, and $E_{SG}$ is combustion heat of SG.

HRSG and Steam Turbine

The mass flow rate of the flue gas in the HRSG is constant, and equals the exhaust of the gas turbine. The

15 maximum amount of steam produced in the HRSG is restricted by energy conservation and useful available energy above the saturated temperature of the steam. The thermal energy of the flue gas of the gas turbine is used to generate steam which goes to the steam turbine. Process steam is extracted at the middle stage of the steam turbine. Extraction of steam will reduce the power output of the steam turbine. Similarly to the NG-fired plant, the power generated by the steam turbine is $P_{ST}=M_{TS}/M_{ms}$. Here, $M_{TS}$ is the total steam flow through the steam turbine, and $M_{ms}$ is the steam flow rate required to generate 1 kWh of electricity.

AS/CC

The air separation process generates $O_2$ for SG combustion and coal gasification. $O_2$ is separated from ambient air. Therefore, the production of $N_2$ and Ar is proportional to the $O_2$ consumption of the system. The $CO_2$ removal process must condense and remove the $CO_2$ produced in SG combustion as well as in coal gasification. Energy consumption of the AS/CC consists of $O_2$ production and $CO_2$ removal.

Tables 4 and 5 summarize the material balance and energy balance of the SG-fired plant, respectively. Here, $CO_{2r}$ is the $CO_2$ recycled back to the gas turbine. Energy includes thermal energy and chemical energy except energy output of the gasifier, which is the combustion heat of SG. Electricity consumption of the AS/CC includes $O_2$ generation and $CO_2$ compression.

TABLE 4

Material Balance of an SG-Fired Plant

|  | Mass | In (kg/s) | Out (kg/s) |
|---|---|---|---|
| Gasifier | Coal | 17.8 | |
|  | $O_2$ | 14.2 | |
|  | $H_2O$ | 23.1 | |
|  | SG | | 49.4 |
|  | Slag | | 5.7 |
| Gas Turbine (GT) | SG | 49.4 | |
|  | $O_2$ | 29 | |
|  | $CO_2$ | 572.3 | |
|  | Flue Gas (FG) | | 650.7 |
| HRSG & Steam Turbine (ST) | FG | 650.7 | 650.7 |
|  | $H_2O$ | 81 | 81 |
| AS/CC | Air | 192.3 | |
|  | $O_2$ | | 44.5 |
|  | $N_2$ | | 145.4 |
|  | Ar | | 2.4 |
|  | FG | 650.7 | |
|  | $CO_2$ | | 66.2 |
|  | $CO_{2r}$ | | 572.3 |
|  | $H_2O$ | | 12.2 |

TABLE 5

Energy balance of an SG-Fired Plant

|  |  | In (MW) | Out (MW) |
|---|---|---|---|
| Gasifier | Energy* | 455.3 | 444.6 |
| GT | Energy | 444.6 | 276 |
|  | Electricity | | 162.4 |
| HRSG & ST | Energy | 276 | 10.3 |
|  | Electricity | | 71.5 |
| AS/CC | Electricity** | 70.4 | |
|  | Cold exergy | | 33.1 |

*includes 444.6 MW chemical and 10.7 MW thermal energy
**includes 21.4 MW for $O_2$ production for the gasifier

16

Energy Efficiency of the SG-Fired Plant

More $O_2$ is consumed in the SG-fired plant than in the NG-fired plant, and more $CO_2$ is removed from the SG-fired plant in terms of kg $O_2$ and kWh of electricity. Therefore, the net power efficiency of the SG-fired plant is lower than that of the NG-fired plant. When auxiliary power consumption is considered, the net power efficiency of the SG-fired plant is $$\eta_{net2}=(P_{GT}+P_{ST}-P_i)(1-e)(E_{in})^{-1} \qquad (3)$$

When e is 0.5%, the net power efficiency of the SG-fired plant ($\eta_{net2}$) is 36.6%. The gross power efficiency of the SG-fired plant ($\eta_{gross}$) is 47.8%. The gross energy efficiency is defined as the ratio of the total power generated minus 21.4 MW for coal gasification to the total energy input (coal energy) without $CO_2$ capture. Thus, 23.4% is lost due to $CO_2$ recapture and coal gasification.

Operation

The new power plant is operated in a manner similar to existing power plants, but does not require any pollution control devices, or even a smokestack, since the only emissions are nitrogen and argon gas, which both can be retained and sold as by-products, and water or water vapor. The plant is supplied with fuel, e.g., natural gas, liquefied natural gas, or synthesis gas, e.g., from coal gasification in the same way the existing plants are supplied. The electric and steam power generated by the plant are delivered and used in the customary way. There is, however, a transition period not found in existing plants.

Transition State Operation

The use of a working fluid that is mostly $CO_2$ with some $H_2O$ in the new power plant requires a large amount of $CO_2$ in the transition period between the start of operation of a new plant and a steady state operation. The total amount of the working fluid ($CO_2$) required by the plant described above can reach 10,000 tonnes during the transition period. The transition period is defined as the total time required to generate enough $CO_2$ for the recycling ratio ($CO_2:O_2$) to reach 12:1. This initial amount of $CO_2$ can be supplied in two ways.

First, the $CO_2$ can be purchased from an external supplier and filled into the plant. The plant will no longer require $CO_2$ input after the transition period. Second, the $CO_2$ can be gradually generated by the plant itself by operating in a transition state. Under design conditions, the plant will generate about 2102 tonnes of $CO_2$ per day. Therefore, it will take the plant about five days to generate 10,000 tonnes of $CO_2$. In the transition state, the plant has zero $CO_2$ output. All of the $CO_2$ recovered from the exhaust gas during the transition state is recycled through the gas turbine, i.e., none is liquefied for removal from the plant.

Steady State Operation

When a sufficient amount of $CO_2$ for the working fluid has accumulated, the plant will continuously recycle about 95 percent of the total $CO_2$ recovered from the exhaust gas. This total amount of $CO_2$ includes previously recycled $CO_2$ and $CO_2$ newly produced by combustion. In this steady state operation, about 5 percent of the total $CO_2$ recovered is liquefied and removed from the plant. This constitutes an amount of $CO_2$ equal to 100 percent of the $CO_2$ newly produced by combustion in the plant.

Once operating under steady state conditions, the plant described above will generate 210 MW of electricity and 51 tonnes of process stream per hour, and will also produce saleable by-products, including 9878 tonnes of nitrogen, 162 tonnes or argon and 2102 tonnes of liquid carbon dioxide per day. Considering the fact that the plant produces these valuable by-products, it is highly profitable besides being environmentally "clean." The novel concepts and techniques described above, namely the integrated AS/CC unit and the CEM, push the net power efficiency of the NG-fired plant to 45% and that of the gasified coal-fired or SG-fired plant to 36.6%. The net efficiency reaches 47% when LNG is used instead of NG.

The efficiency losses due to $CO_2$ recovery are relatively modest when one considers the environmental gains of nearly 100% $CO_2$ recovery, no sulfur oxides, no nitrogen oxides, and no particulate emissions. Furthermore, the new plants produce saleable by-products, which makes them economically competitive with advanced conventional power plants.

Other Embodiments

It is to be understood that while the invention has been described in conjunction with the detailed description thereof, that the foregoing description is intended to illustrate and not limit the scope of the invention, which is defined by the scope of the appended claims. Other aspects, advantages, and modifications are within the scope of the following claims.

What is claimed is:

1. A power plant comprising
    an air separation unit arranged to separate oxygen from air and produce a stream of substantially pure liquid oxygen;
    a gas turbine arranged to combust a fuel in the presence of substantially pure oxygen gas and carbon dioxide gas, and to produce an exhaust gas comprising water and carbon dioxide; and
    a carbon dioxide removal unit arranged to recover carbon dioxide gas from the exhaust gas, recycle a portion of the recovered carbon dioxide gas for passage through said gas turbine, and liquefy the remainder of the recovered carbon dioxide gas for removal from the plant;
    wherein said carbon dioxide removal unit is thermally integrated with said air separation unit by directing the stream of liquid oxygen from said air separation unit to said carbon dioxide removal unit to liquefy the remainder of the recovered carbon dioxide gas, the liquid oxygen thereby evaporating and forming cold oxygen gas which is directed to cool the recycled carbon dioxide gas prior to passage of the carbon dioxide gas through said gas turbine, and the oxygen gas is then directed to said gas turbine.

2. A power plant of claim 1, wherein the fuel is natural gas, liquefied natural gas, or synthesis gas.

3. A power plant of claim 1, wherein said air separation unit separates nitrogen from the air and produces a stream of cold, substantially pure nitrogen, and wherein the cold nitrogen is directed to cool the air prior to separation of oxygen and nitrogen.

4. A power plant of claim 3, wherein the substantially pure nitrogen is at least 95 percent nitrogen in the form of a gas.

5. A power plant of claim 1, wherein the substantially pure liquid oxygen is at least 95 percent oxygen.

6. A power plant of claim 1, wherein the substantially pure liquid oxygen is at least 99.5 percent oxygen.

7. A power plant of claim 1, wherein about 5 percent of the recovered carbon dioxide is liquefied for removal from the plant.

8. A power plant of claim 1, wherein about 95 percent of the recovered carbon dioxide is recycled for passage through said gas turbine.

9. A power plant of claim 1 in a steady state operation, wherein an amount of carbon dioxide equal to 100 percent of the carbon dioxide produced from combustion is liquefied for removal from the plant.

10. A power plant of claim 1, wherein said air separation unit comprises a cooler arranged to cool the air prior to separation of oxygen, a compressor arranged to pressurize the air prior to separation of oxygen, and a distillation tower arranged to separate the oxygen from the air.

11. A power plant of claim 1, wherein said carbon dioxide removal unit comprises a compressor arranged to pressurize the remainder of the recovered carbon dioxide gas, a filter arranged to remove water vapor from the remainder of the recovered carbon dioxide gas, a cooler arranged to cool the remainder of the recovered carbon dioxide gas, and a condenser arranged to liquefy the remainder of the recovered carbon dioxide gas using the liquid oxygen as a cooling source.

12. A power plant of claim 1, further comprising
    a compressor arranged to pressurize the liquid oxygen from said distillation column prior to directing the liquid oxygen to said carbon dioxide removal unit to liquefy the remainder of the recovered carbon dioxide gas; and
    a heat exchanger arranged such that the cold oxygen gas from said carbon dioxide removal unit is used to cool the recycled carbon dioxide gas prior to passage of the carbon dioxide gas through said gas turbine.

13. A power plant of claim 3, further comprising
    a compressor arranged to pressurize the liquid oxygen from said distillation column prior to directing the liquid oxygen to said carbon dioxide removal unit to liquefy the remainder of the recovered carbon dioxide gas; and
    heat exchangers arranged such that both the cold oxygen gas and the cold nitrogen from said air separation unit are used to cool the recycled carbon dioxide gas prior to passage of the carbon dioxide gas through said gas turbine.

14. A power plant of claim 12, wherein said liquid oxygen is pressurized to a pressure of at least 17 bar.

15. A power plant of claim 12, further comprising a heat recovery steam generator arranged to produce steam and a flue gas using the exhaust gas from said gas turbine as a heat source, and further arranged to heat the cold oxygen gas produced by liquefaction of the remainder of the recovered carbon dioxide gas, prior to passage of the oxygen into said gas turbine.

16. A method of generating electricity with virtually zero pollutant emissions in a power plant having a gas turbine, said method comprising
    arranging the gas turbine to combust a fuel in the presence of substantially pure oxygen gas and carbon dioxide gas, and to produce an exhaust gas consisting essentially of water and carbon dioxide;
    recovering carbon dioxide gas from the exhaust gas;
    recycling a first portion of the recovered carbon dioxide gas for passage through the gas turbine;
    separating oxygen from air and producing a stream of substantially pure liquid oxygen;
    directing said substantially pure liquid oxygen to cool the recycled carbon dioxide gas prior to passage of the carbon dioxide through the gas turbine, and to liquefy a remaining portion of the recovered carbon dioxide gas for removal from the plant, the liquid oxygen thereby evaporating and forming oxygen gas; and directing the oxygen gas to the gas turbine.

17. A method of claim 16, wherein the fuel is natural gas, liquefied natural gas, or synthesis gas.

18. A method of claim 16, further comprising the steps of separating nitrogen from the air and producing a stream of substantially pure nitrogen; and directing the cold nitrogen to cool the recycled carbon dioxide gas prior to passage of the carbon dioxide gas through said gas turbine, and to cool the air prior to separation of oxygen and nitrogen.

19. A method of claim 16, further comprising the steps of compressing the substantially pure liquid oxygen prior to evaporation of the liquid oxygen during liquefication of the remaining portion of the recovered carbon dioxide gas, thereby forming cold oxygen gas; and heating the cold oxygen gas after directing the cold oxygen gas to cool the recycled carbon dioxide gas, and prior to passage of the oxygen gas into said gas turbine.

20. A method of claim 16, wherein about 95 percent of the recovered carbon dioxide gas is recycled, and about 5 percent of the recovered carbon dioxide gas is liquefied for removal from the plant.

21. A method of claim 16, wherein during steady state operation, an amount of carbon dioxide equal to 100 percent of the carbon dioxide gas produced from combustion is liquefied for removal from the plant.

22. A method of claim 16, wherein the exhaust gas contains less than 100 parts per million by volume of nitrogen oxides.

23. A power plant of claim 1, wherein the exhaust gas contains less than 100 parts per million by volume of nitrogen oxides.

* * * * *